No. 645,032. Patented Mar. 6, 1900.
C. JOHANSON.
AGRICULTURAL SPIDER.
(Application filed May 6, 1899.)
(No Model.)
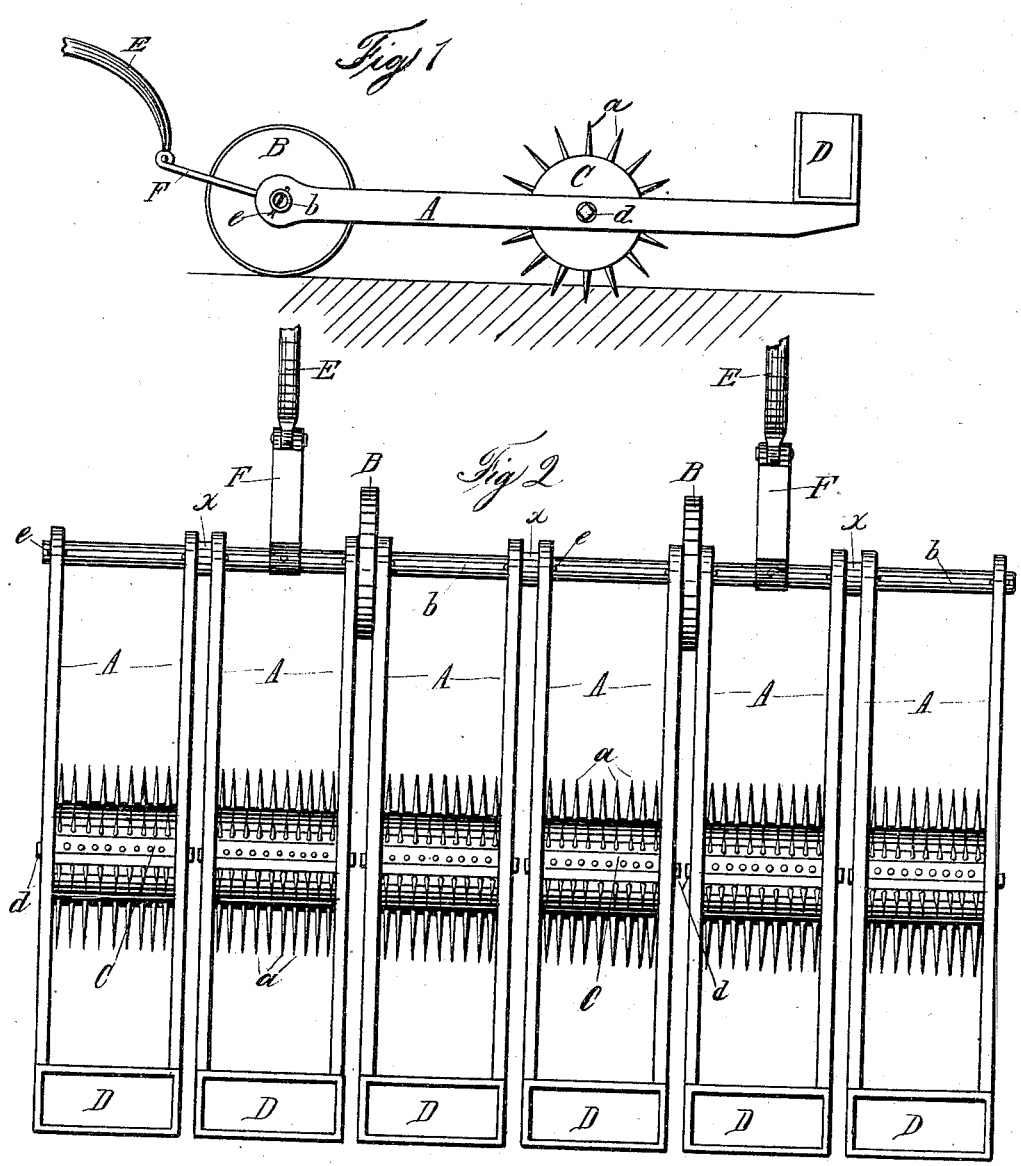
WITNESSES:
C. F. Patterson
M. A. Dodsworth
INVENTOR
Charly Johanson
BY
George W. Lee
ATTORNEY.

United States Patent Office.

CHARLY JOHANSON, OF ARLINGTON, NEBRASKA.

AGRICULTURAL SPIDER.

SPECIFICATION forming part of Letters Patent No. 645,032, dated March 6, 1900.

Application filed May 6, 1899. Serial No. 715,876. (No model.)

*To all whom it may concern:*

Be it known that I, CHARLY JOHANSON, residing at Arlington, in the county of Washington and State of Nebraska, have invented certain useful Improvements in Agricultural Spiders; and I do hereby declare that the following is a full, clear, and exact description of the invention, such as will enable others skilled in the art to which it appertains to make and use the same, reference being had to the accompanying drawings, which form a part of this specification.

This invention has relation to agricultural spiders, the object of my invention being to provide an implement with a plurality of projecting pins adapted to penetrate the surface of the earth a suitable distance to provide a number of fine openings adapted to admit air to the growing plants, it being understood that this implement is to be used as a cultivator.

In the accompanying drawings, Figure 1 shows an end view of my agricultural spider, while Fig. 2 shows a top view thereof.

The aim of my invention is primarily to provide an apparatus or implement adapted to be carried immediately over the young and growing seeds and plants, so that the crust surrounding them may be broken, though without destroying the tender vegetation.

In carrying out the aim of my invention I provide a bar $b$, which may be in the shape of a tube, from which extend two stub-brackets F F, to which are secured the shafts E, so that a draft-animal can be readily attached. Movably working upon this tube $b$ are a plurality of frames, each frame comprising two main sills A A, which sills in front are movably secured to the tube $b$, while in the rear I provide an ordinary box or receptacle D, which unites these two sills A. At a suitable point each of these sills A is provided with a shaft $d$, passing through one set of sills and supporting a cylinder C, from which cylinder extend a plurality of short pins $a$, as is shown. Each frame is separated from the other by means of a small washer $x$, excepting at two points, where the bar $b$ is provided with two ordinary supporting-wheels B, which support the forward ends of the frames. From this it will be seen that I provide a main-wheel-supported stem, from which stem extends in one direction a shaft, while in the opposite direction extend a plurality of frames, each working independently and which frames are each provided with a spider comprising a cylinder C, having a plurality of projecting pins $a$. As this implement is carried over the field the pins perforate the earth to give it the appearance of a sieve, forming a great number of minute openings, the pins being placed so closely together that should a crust have been formed above the seed or around the plants the same will be broken without destroying the seed or vegetation, for the reason that the pins do not enter the soil deep enough to destroy the seed nor do they destroy the vegetation. It is of course understood that this implement is only used during the first stages of the growth of the plants.

In order to regulate the depth or penetrating distance of the pins $a$, the boxes D are provided with soil, so that these pins enter the earth a suitable distance. The depth to which these pins are to travel can of course be nicely regulated.

Now, having thus described my said invention, what I claim as new, and desire to secure by United States Letters Patent, is—

1. The combination with the bar $b$, of the shafts E, the wheels B supporting said bar $b$, the sills A, A, extending from said bar $b$, the receptacles D, each receptacle uniting two of said sills A, A, the shafts $e$, there being one shaft for each two sills to connect the same, and the cylinders C, there being one cylinder upon each of said shafts $e$, each cylinder being provided with a plurality of pins $a$, as and for the purpose set forth.

2. The combination with a wheeled support, of a plurality of frames movably secured to and extending from said support, a weight-box secured to each frame, and a cylinder revolubly held within each frame provided with a plurality of projecting pins, all arranged substantially as and for the purpose set forth.

CHARLY JOHANSON.

In presence of—
 THOS. FENNELL,
 H. W. SCHOETTGER.